Sept. 15, 1964          E. V. CURTIS ETAL          3,148,912
                       STOCK RACK AND END GATE
Filed April 6, 1962                              2 Sheets-Sheet 1

INVENTOR

BY

ATTORNEY

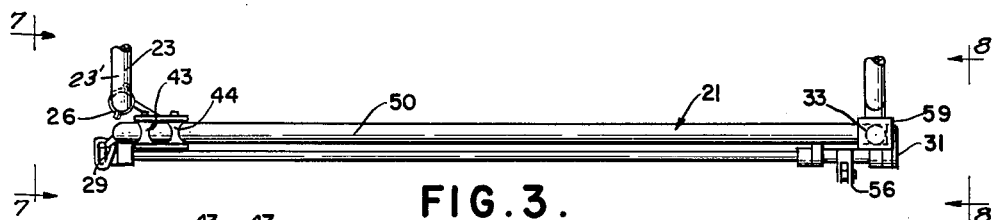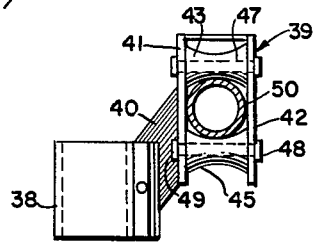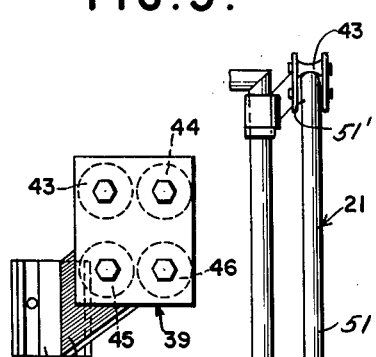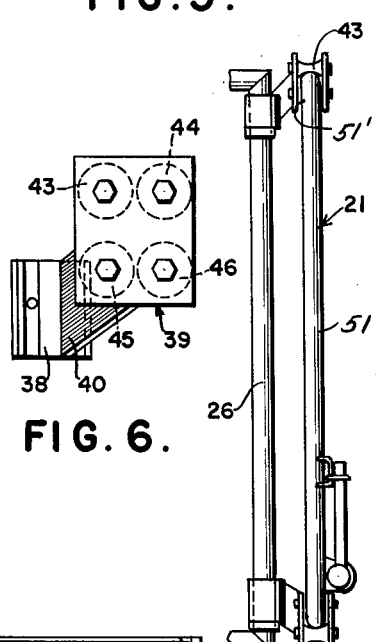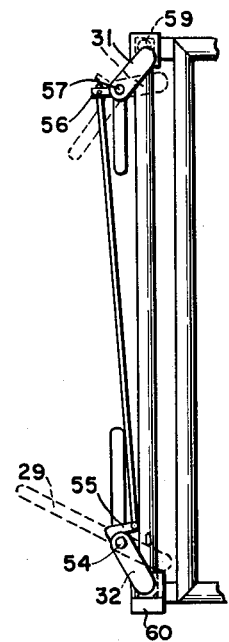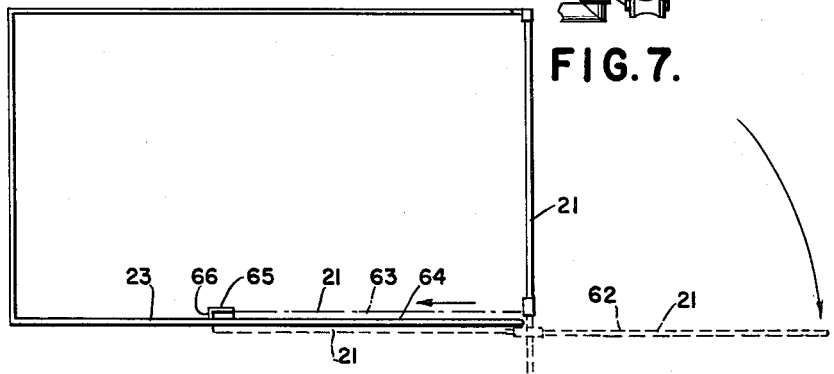

United States Patent Office  3,148,912
Patented Sept. 15, 1964

3,148,912
STOCK RACK AND END GATE
Edgar V. Curtis and Mildred J. Curtis, Colstrip, Mont.
Filed Apr. 6, 1962, Ser. No. 185,559
2 Claims. (Cl. 296—50)

This invention relates primarily to structure for hauling and handling livestock and the like; more particularly the invention relates to improvements in stock rack and end gate structure for mounting upon pickup trucks and various other types of transport vehicles for hauling livestock, such as cows, horses, sheep, pigs, etc.

In the past, the hauling of livestock has been accomplished in many cases by means of conventional box structure normally installed upon various types of trucks. However, none of these has been entirely satisfactory for loading and unloading from livestock chutes and the hauling of livestock.

It is an object of this invention to overcome the prior deficiencies in stock rack and end gate devices for livestock and to provide a novel improved livestock rack having an end gate which may be opened and closed without moving the vehicle away from the loading chute or area.

It is a further object of the invention to provide a novel end gate which slides across the full width of the tail end of the stock rack and also which may be slid open to partially vary the width of the opening.

It is a further object of the invention to provide an end gate which may be swung backward along the length of the rack where it may be fastened by lever locks.

It is another object of the invention to provide an end gate and rack wherein the end gate slides rapidly across the opening and is locked secured at the top and bottom by lever locks.

Further objects and advantages will become apparent as the description proceeds and when taken in conjunction with the accompanying drawings, wherein:

FIGURE 3 is a top view of the end gate and a fragmentary showing of the engaging side portions of the stock rack;

FIGURE 4 is a side view of the roller hinge mounting for the end gate;

FIGURE 5 is a top view of the roller hinge mounting for the end gate;

FIGURE 6 is an end view of the roller hinge mounting;

FIGURE 7 is a side elevational view taken along line 7—7 of FIGURE 3;

FIGURE 8 is a side elevational view taken along line 8—8 of FIGURE 3;

FIGURE 9 is a top elevational view of the movement and positioning of the end gate.

Briefly stated, the invention comprises a roller mounted end gate and stock rack, with the end gate being mounted for rectilinear movement across the rear of the stock rack for opening and closing the rear end of the stock rack, and with the end gate also being pivotally mounted so as to pivot the end gate flush against the inside or outside of one of the side frames of the stock rack.

The invention further includes locking means for locking the end gate when rolled across the end of the rack, and also for locking the end gate when pivoted and slid into its flush position inside the stock rack.

Figure 1:
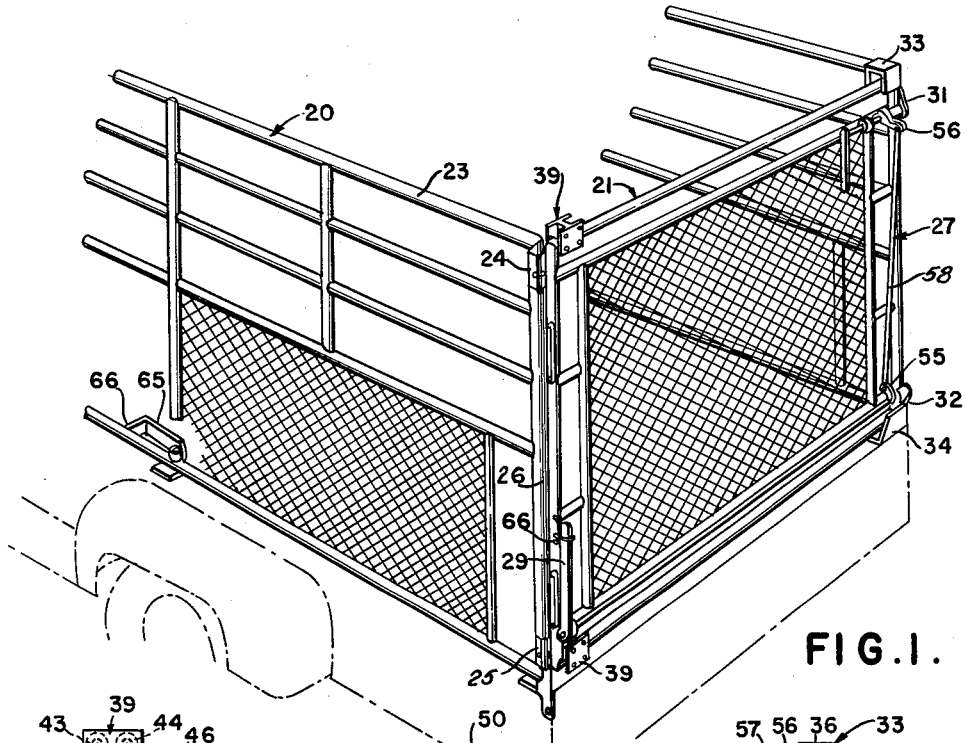
FIGURE 1 is a perspective view of the stock rack and end gate device.
Figure 2:
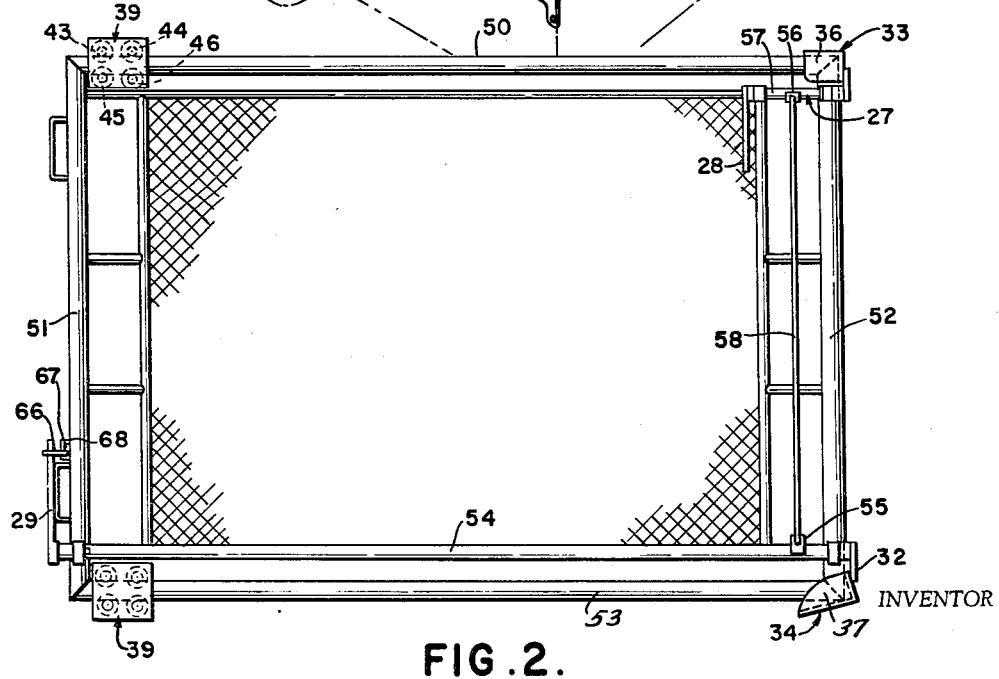
FIGURE 2 is an end elevational view of the end gate mounted to the stock rack.

With further, more detailed reference to the drawings, FIG. 1 is a fragmentary showing of the stock rack 20, with the end gate 21 pivotally mounted to the left side frame 23 of the stock rack 20, by means of a pair of roller hinges 24 and 25 which pivot about the longitudinal vertical axis of the vertical rear post 26. A locking mechanism 27 is provided at the opposite end of the end gate 21, opposite the roller hinges, which locking mechanism is operated either by handle 28 or handle 29. The handle 28 is fixed to a rod 30 which, upon rotation of the rod, pivots the locking plates 31 and 32 against the side of the U-shaped guide and stop member 33 and 34. The U-shaped guide and stop members are welded or fixed to the right side frame member 35 of the stock rack 20, and are adapted to slidably receive the upper and lower corners 36 and 37 of the end gate frame 21 when the end gate is closed into the position shown in FIG. 1.

The roller hinges 24 and 25 are each provided with a sleeve portion 38 which encircles the post 26 and is adapted to pivot about the post 26. The roller hinges 24 and 25 are each further provided with a roller device portion 39 which is fixed to the sleeve portion by means of a connecting flange 40.

The roller device portion 39 comprises a pair of rectangular side flanges 41 and 42 for mounting four tapered rollers 43, 44, 45 and 46, each roller having a rod 47 which passes through the center of the rollers and through holes in the flanges 41 and 42 and are provided with enlarged heads 48 and 49 for fixing the rods to the flanges 41 and 42, each of the rollers being free to rotate upon the rods 47.

The end gate 21 is provided with a horizontal upper pipe or bar 50 which is adapted to be received between the rollers of the roller device portion 39 of the upper roller hinge 24. The horizontal upper bar 50 is welded at its ends to the vertical bars 51 and 52 of the end gate to form the upper corners of the end gate 21 and a lower horizontal bar 53 is welded to the lower ends of the vertical bars 51 and 52 to form the lower corners of the end gate 21, with the bars 50, 51, 52 and 53 defining the outside frame of the end gate. The lower horizontal bar 53 is similarly received between rollers of the roller device portion 39 of the lower roller hinge 25, whereby the end gate may be moved rectilinearly relative to the roller hinges 24 and 25 by the pipes 50 and 53 rolling along the rollers of the respective roller device portions of the upper and lower roller hinges.

The locking mechanism includes a horizontal pivot rod 54 which is pivotally mounted to the lower portion of the end gate 21 and adapted to pivot about the longitudinal horizontal axis in response to the movement of either handles 29 or 28. A dog 55 projects outward from the lower pivot rod 54 and a similar dog 56 projects outwardly from a shorter horizontal pivot rod 57 which is pivotally mounted to the upper portion of the end gate to pivot about its horizontal longitudinal axis, and a connecting rod 58 is pivotally connected at its opposite ends to the outer ends of each of the dogs whereby the rotation of the lower horizontal pivot rod 54, in response to the movement of the handle 29, will move the connecting rod 58, which will also simultaneously pivot the upper horizontal pivot rod 57. This causes the upper and lower locking plates 31 and 32 to move simultaneously, being fixed to the outer ends of the respective pivot rods 54 and 57, to thereby simultaneously move the plates 31 and 32 into and out of locking engagement with the rear face portions 59 and 60 of the U-shaped guide and stop members 33 and 34.

The movement of the locking plates out of engagement with face portions 59 and 60 of the U-shaped channel members, as shown in dashed lines in FIG. 8, leaves the end gate free to slide along the roller mounting to the position shown in dashed lines (61) in FIG. 9, and thereby open the end gate 21 of the stock rack 20.

Once the end gate has been unlocked and slid out of the U-shaped channels, it is also free to pivot into the alternate position (62) shown in FIG. 9. This pivoting movement is limited in that the end gate will not swing beyond the position (62) by the engagement of the bar 21' against the outside of the horizontal bar portions 23' of side frame 23.

The end gate 21 may also be moved into the position 63, by sliding the gate 21, after the unlocking of the same, out of the U-shaped channels a short distance and then pivoting the end gate 21 counterclockwise against the inner side 64 of the side frame 23, so that it rests in a substantially flush relationship. Then the end gate 21 may be slid forward again with the corner 37 of the end gate being received between the flanges of the U-shaped channel member 65, and retained there. The locking mechanism may then be reengaged by pivoting plate 32, downward, in response to either handle 28 or 29, across the forward face 66 of the U-shaped channel, thereby locking the end gate in its position shown by 63.

An elongated ring 66 is mounted to move upward and downward in the slot 67 of the bracket 68, which is mounted to the end gate 21, adjacent handle 29. The ring 66 thus may be slid over the handle 29 when upright as shown in FIG. 1, thereby locking the handle 29 upright and thereby securing the locking plate in the closed position shown in FIGS. 1 and 3, thus locking the end gate closed.

Thus it may be seen that a novel end gate structure and operation, and stock rack and cooperating locking operation are provided by the invention wherein the end gate operation may be easily used with cattle chutes and without moving the truck carrying the rack and end gate, away from the loading chute.

Also, it will be seen that the end gate cannot fall off or swing open into a traffic lane and a positive locking operation is provided.

Also, the rectilinear opening of the end gate minimizes the danger of a person being kicked or charged during the loading operation.

It will also be apparent that various changes may be made to the invention without departing from the spirit and scope thereof, and that, accordingly, the invention is not limited by that which is specifically shown and described but only as set forth in the appended claims.

What is claimed is:

1. A stock loading and hauling device comprising a loading rack, said rack having a pair of upright parallel side members, an upright end gate extending laterally across the ends of said side members, a pair of roller hinge mountings pivotally secured to the end of one of said side members by means of a sleeve and spaced one above the other, each hinge mounting having a pair of upper and lower convex rollers, said end gate including a cylindrical horizontal upper bar member and lower bar member, said convex upper and lower rollers of said upper hinge mounting embracing said horizontal upper bar member of said gate and providing a roller support thereto, said convex rollers of said lower hinge mounting embracing said horizontal lower bar and providing a roller support thereto, said hinge mounting being pivotally mounted to said end of said one side member to swing said gate in an arcuate path, said gate member being adapted to move rectilinearly along said rollers to travel in a direction laterally across said ends of said side members to close said ends, an upper and lower latch pivotally mounted to said gate, a lever adapted to simultaneously actuate said upper and lower latches to engage said latches to one of said side members to secure said gate in said closed position.

2. A stock loading rack comprising a pair of upright parallel side members, an upright end gate adapted to extend laterally across one of the ends of said side members, a pair of roller sleeve mountings spaced one above the other and each having a sleeve which encircles and is pivotally attached to the one end of one of said side members, each sleeve mounting further includes a pair of upper convex rollers and a pair of lower convex rollers, said end gate including a cylindrical horizontally elongated upper pipe member and lower pipe member extending along the length of said gate, said convex upper and lower rollers of said upper mounting embracing said upper pipe member and said convex upper and lower rollers of said lower mounting embracing said lower pipe member to provide a roller support and guideway for moving said gate rectilinearly relative to said rollers, an upper and lower channel member at said one end of the other of said side members to receive said gate when moved laterally across, an upper and lower latch member pivotally mounted to said gate to pivot perpendicularly to the plane of said gate to engage said upper and lower channel members to lock said gate, a handle adapted to operate both of said latch members simultaneously.

References Cited in the file of this patent
UNITED STATES PATENTS

| | | |
|---|---|---|
| 243,318 | Smith | June 21, 1881 |
| 392,599 | Faulkner | Nov. 13, 1888 |
| 1,342,227 | Raley | June 1, 1920 |
| 2,531,310 | Tonn | Nov. 21, 1950 |
| 2,695,192 | Strom | Nov. 23, 1954 |
| 2,797,959 | Brice | July 2, 1957 |